US010805073B2

(12) United States Patent
Gazit et al.

(10) Patent No.: US 10,805,073 B2
(45) Date of Patent: *Oct. 13, 2020

(54) GENERATING MASTER AND WRAPPER KEYS FOR CONNECTED DEVICES IN A KEY GENERATION SCHEME

(71) Applicant: International Business Machines Corporation, Armonk, NY (US)

(72) Inventors: Ronen Gazit, Tel Aviv (IL); Ron S. Shapiro, Tel Aviv (IL); Lior Shlomov, Or Yehuda (IL); Ariel Waizel, Ziona (IL); Guy-Arie Yur, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,513

(22) Filed: Jan. 2, 2019

(65) Prior Publication Data

US 2019/0140824 A1 May 9, 2019

Related U.S. Application Data

(63) Continuation of application No. 14/866,705, filed on Sep. 25, 2015, now Pat. No. 10,237,061.

(51) Int. Cl.
*H04L 9/08* (2006.01)
*H04L 9/14* (2006.01)
*H04L 9/06* (2006.01)

(52) U.S. Cl.
CPC ............ *H04L 9/083* (2013.01); *H04L 9/0643* (2013.01); *H04L 9/0822* (2013.01);
(Continued)

(58) Field of Classification Search
None
See application file for complete search history.

(56) References Cited

U.S. PATENT DOCUMENTS 6,975,728 B1 12/2005 Eye et al.
7,239,701 B1 7/2007 Ogishi et al.
(Continued)

OTHER PUBLICATIONS

US Patent Application, dated Sep. 25, 2015, for U.S. Appl. No. 14/866,705 (37.342), filed Sep. 25, 2015, invented by Ronen Gazit et al., Total 34 pages.
(Continued)

*Primary Examiner* — Kambiz Zand
*Assistant Examiner* — Arezoo Sherkat
(74) *Attorney, Agent, or Firm* — David W. Victor; Konrad, Raynes, Davda and Victor LLP (57) ABSTRACT

Provided are a computer program product, system, and method for generating master and wrapper keys for connected devices in a key generation scheme. For each of the devices, a wrapped master key comprising a master key for the device and a wrapper key is stored. The wrapper keys for a plurality of the devices are generated by another of the devices. For each of a plurality of the devices, the master key for the device is used to generate the wrapper key for a target device comprising another of the devices. For each of the devices, the wrapper key for the device is used to decrypt the stored wrapped master key. At least one of the devices uses the master key for the device to encrypt and decrypt data at the device.

20 Claims, 8 Drawing Sheets (52) U.S. Cl.
CPC .......... *H04L 9/0836* (2013.01); *H04L 9/0861* (2013.01); *H04L 9/0866* (2013.01); *H04L 9/14* (2013.01); *H04L 2209/24* (2013.01)

(56) References Cited

U.S. PATENT DOCUMENTS

| | | | |
|---|---|---|---|
| 8,422,681 B2 | 4/2013 | Gennaro et al. | |
| 8,989,388 B2 | 3/2015 | Patnala et al. | |
| 9,680,805 B1* | 6/2017 | Rodgers | H04L 63/0281 |
| 2004/0215661 A1 | 10/2004 | Zhang et al. | |
| 2005/0284152 A1 | 12/2005 | Christiansen | |
| 2006/0034457 A1 | 2/2006 | Damgaard et al. | |
| 2008/0273697 A1* | 11/2008 | Greco | G11B 20/00086 |
| | | | 380/44 |
| 2009/0225986 A1* | 9/2009 | Gennaro | H04L 9/0836 |
| | | | 380/278 |
| 2009/0252330 A1* | 10/2009 | Patnala | H04L 9/0822 |
| | | | 380/279 |
| 2011/0040812 A1 | 2/2011 | Phillips | |
| 2012/0131354 A1 | 5/2012 | French | |
| 2012/0237033 A1* | 9/2012 | Tanaka | H04W 12/04 |
| | | | 380/270 |
| 2013/0042313 A1 | 2/2013 | Lambert | |
| 2014/0064490 A1* | 3/2014 | Wang | H04L 9/0836 |
| | | | 380/278 |
| 2014/0095879 A1 | 4/2014 | Fedronic et al. | |
| 2014/0247938 A1 | 9/2014 | Desmicht et al. | |
| 2015/0052369 A1 | 2/2015 | Koning et al. | |
| 2015/0113272 A1 | 4/2015 | Han et al. | |
| 2016/0173282 A1 | 6/2016 | Circello et al. | |
| 2017/0093805 A1 | 3/2017 | Proulx | |

OTHER PUBLICATIONS

Office Action, dated Jan. 13, 2017, for U.S. Appl. No. 14/866,705 (37342), filed Sep. 25, 2015, invented by Ronen Gazit et al., Total 23 pages.
Response to Office Action, dated Apr. 13, 2017, for U.S. Appl. No. 14/866,705 (37.342), filed Sep. 25, 2015, invented by Ronen Gazil et al., Total 12 pages.
Final Office Action, dated Jun. 30, 2017, for U.S. Appl. No. 14/866,705 (37.342), filed Sep. 25, 2015, invented by Ronen Gazit et al., Total 23 pages.
Response to Final Office Action, dated Aug. 30, 2017, for U.S. Appl. No. 14/866,705 (37.342), filed Sep. 25, 2015, invented by Ronen Gazit et al., Total 14 pages.
Office Action, dated Nov. 20, 2017, for U.S. Appl. No. 14/866,705 (37342), filed Sep. 25, 2015, invented by Ronen Gazit et al., Total 29 pages.
Response to Office Action, dated Feb. 20, 2018, for U.S. Appl. No. 14/866,705 (37.342), filed Sep. 25, 2015, invented by Ronen Gazit et al., Total 18 pages.
Final Office Action, dated Mar. 16, 2018, for U.S. Appl. No. 14/866,705 (37.342), filed Sep. 25, 2015, invented by Ronen Gazit et al., Total 30 pages.
Notice of Allowance, dated Nov. 1, 2018, for U.S. Appl. No. 14/866,705 (37.342), filed Sep. 25, 2015, invented by Ronen Gazit et al., Total 16 pages.
List of IBM Patents or Patent Applications Treated as Related, dated Jan. 2, 2019, pp. 2.
Pre Appeal Brief, dated Jun. 18, 2018, for U.S. Appl. No. 14/866,705 (37.342), filed Sep. 25, 2015, invented by Ronen Gazit et al., Total 6 pages.
Revised Appeal Brief, dated Sep. 10, 2018, for U.S. Appl. No. 14/866,705 (37.342), filed Sep. 25, 2015, invented by Ronen Gazit et al., Total 28 pages.

* cited by examiner

GENERATING MASTER AND WRAPPER KEYS FOR CONNECTED DEVICES IN A KEY GENERATION SCHEME

BACKGROUND OF THE INVENTION

1. Field of the Invention

The present invention relates to a computer program product, system, and method for generating master and wrapper keys for connected devices in a key generation scheme.

2. Description of the Related Art

Self-Encryption Devices (SEDs) comprise storage devices that maintain stored data in encrypted form to provide protection for user data at rest. An SED may maintain a master key used to encrypt and decrypt data in the SED, and maintain the master key cryptographically wrapped or encapsulated with an externally provided wrapper key. For security purposes, immediately after using the wrapping key, the SED device disposes of the wrapper key and erases all traces of the wrapper key from memory. Upon power-up cycle, the wrapper key needs to be resubmitted to the SED device to unlock the wrapped master key in the SED.

In a system that deploys SED devices supporting a Trusted Computing Group (TCG) protocol, there may be multiple hierarchies of devices between the system's controller and the SEDs. An example of such hierarchy is the use of Redundant Array of Independent Disk (RAID) controllers with the system controller on one end, and the SED devices on another end. In such a system there are commonly multiple RAID controllers and each RAID controller interfaces with multiple SED devices.

Each of the devices in the hierarchy, including the RAID controllers and SED devices, may use a same wrapper key, which the SEDs receive from the RAID Controllers and use to wrap their master key. Alternatively, there may be multiple different wrapper keys for the devices in the hierarchy, including the RAID controllers and SED storage devices. However, the use of different wrapper keys requires that information on all the different wrapper keys be maintained at one location so they can be supplied to the devices when needed to encrypt or decrypt the master key.

There is a need in the art for improved techniques for generating and managing encryption keys in a hierarchy of devices.

SUMMARY

Provided are a computer program product, system, and method for generating master and wrapper keys for connected devices in a key generation scheme. For each of the devices, a wrapped master key comprising a master key for the device and a wrapper key is stored. The wrapper keys for a plurality of the devices are generated by another of the devices. For each of a plurality of the devices, the master key for the device is used to generate the wrapper key for a target device comprising another of the devices. For each of the devices, the wrapper key for the device is used to decrypt the stored wrapped master key. At least one of the devices uses the master key for the device to encrypt and decrypt data at the device.

DETAILED DESCRIPTION

Described embodiments provide techniques for generating a unique master key and wrapping key for each device in each layer of a hierarchy of devices that generates all wrapping and master keys from a single master key. Further, described embodiments provide an encryption scheme such that if one device is compromised, other devices at the same or other levels in the key management scheme hierarchy will not be compromised because each device has a different master key, which may be provided from another device in the hierarchy such as a device higher in the hierarchy.

With described embodiments, each of the devices in a hierarchy of devices stores a wrapped master key formed by cryptographically wrapping a master key for the device with a wrapper key. The master keys and the wrapper keys for a plurality of the devices in the hierarchy are generated by other of the devices in the hierarchy. For a plurality of the devices, the master key for the device is used to generate the master key and the wrapper key for a target device comprising another of the devices connected to the device generating the wrapper and master keys. Wrapping and unwrapping may comprise a cryptographic operation involving encryption and decryption. Devices may generate the wrapper and master keys for target devices at a level of the hierarchy below the generating device. For each of the devices receiving a wrapper key, the wrapper key for the device is used to decrypt the stored wrapped master key. Some of the devices, such as devices at the bottom level of the hierarchy, i.e., the leaf nodes, may use their unwrapped master key to encrypt and decrypt data at the device, such as data in a storage media.

Figure 1:
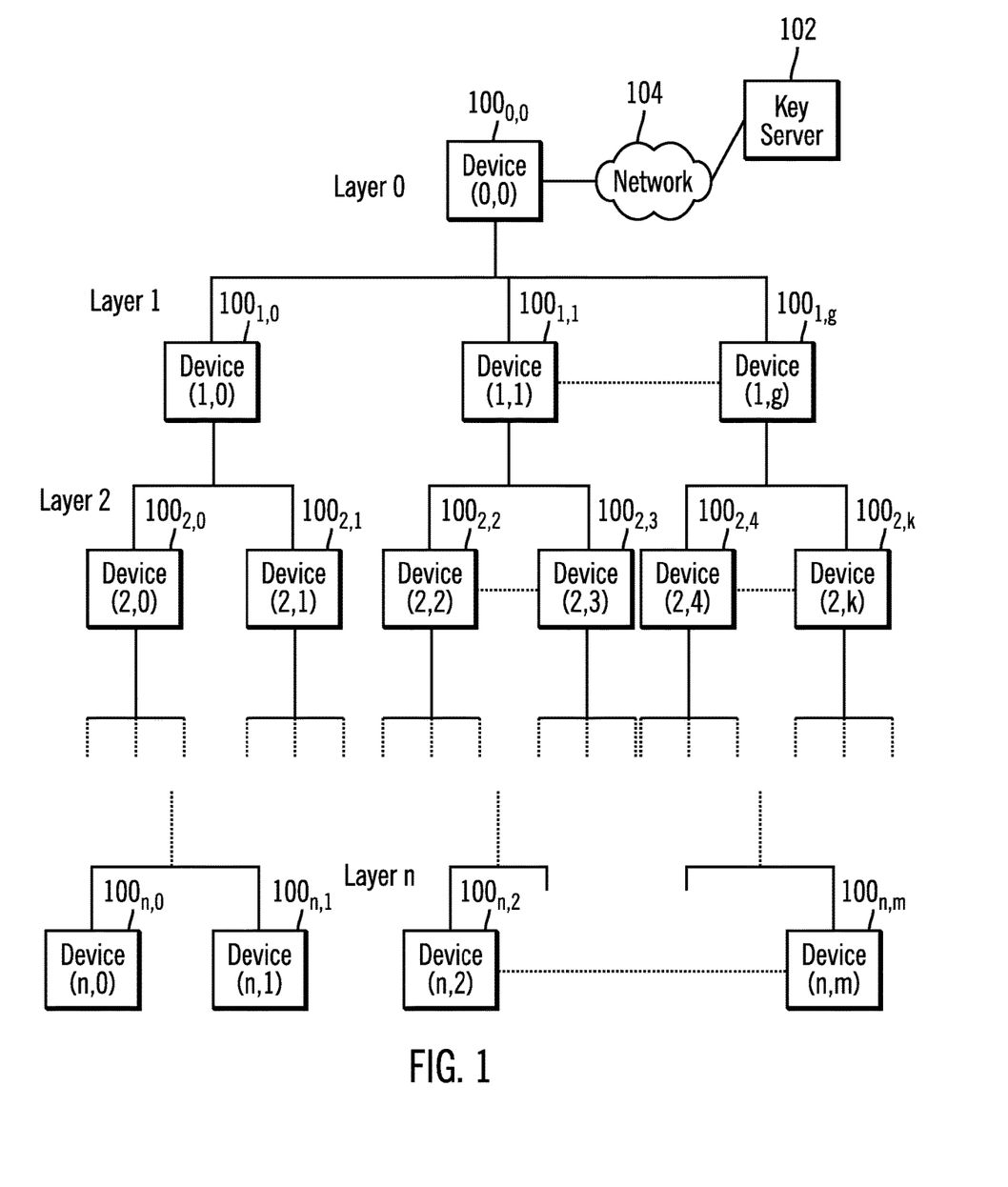
FIG. 1 illustrates an embodiment of a hierarchy of devices.

FIG. 1 illustrates an embodiment of a computing environment having a hierarchical arrangement of devices $100_{i,j}$ in layers 0 . . . n, where device $100_{i,j}$ comprises a jth device, where j is a value from zero to the last number of devices in layer i. A first or root device $100_{0,0}$ in the hierarchical arrangement may authenticate with a key server 102 over a network 104 to obtain a key to initiate the key management scheme. The devices $100_{i,j}$ in the hierarchical relationship may be arranged in a physical hierarchical relationship in layers as shown in FIG. 1. Alternatively, the hierarchical relationship may reflect logical connections between the devices even though the devices may be in a physical distributed relationship that is not hierarchical as shown in FIG. 1.

FIG. 1 shows a certain number of devices at each level of the hierarchy. However, the number of connections shown in FIG. 1 are by way of example, and there may be any number of devices at the levels of the hierarchy connected to a device at an upper level in the hierarchy, so that each device in the hierarchy may be connected to zero or more devices, where devices at the lowest level of the hierarchy are not connected to any further devices at a lower level of the hierarchy.

The devices $100_{i,j}$ may comprise any devices that communicate in a hierarchical fashion. The devices $100_{i,j}$ may comprise devices in a storage system or other computational system, such as a logical system, virtual system, physical components, a distributed database, etc. Further, in certain embodiments, the devices $100_{n,j}$ at the lowest layer may use the encryption key provided according to the described embodiments to encrypt and decrypt data at the devices $100_{n,j}$. The device at the lowest layer may use its master key to directly encrypt or decrypt or use the master key to generate or unlock another encryption key used to encrypt and decrypt data.

Figure 2:
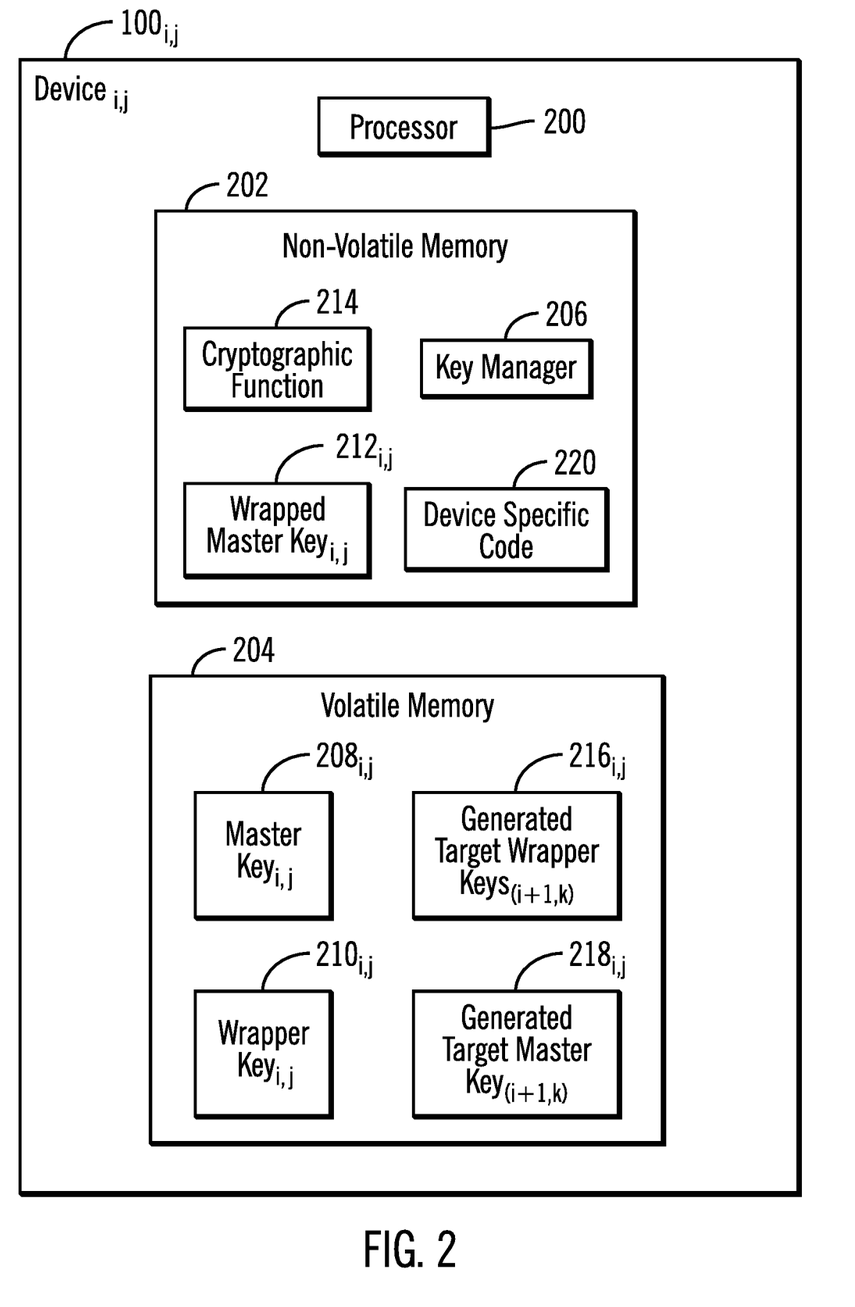
FIG. 2 illustrates an embodiment of components in each of the devices in the hierarchy.

FIG. 2 illustrates an embodiment of each of the devices $100_{i,j}$ as including a processor 200 that can access data and execute code in a non-volatile memory 202 and a volatile memory 204. The non-volatile memory 202 includes a key manager 206 to perform key management operations. The key manager 206 receives a master key $208_{i,j}$ and wrapper key $210_{i,j}$ from a connected device $100_{i-1,k}$ at the above layer i−1 of the hierarchy and stores the received keys $208_{i,j}$ and $210_{i,j}$ in the volatile memory 204. The key manager 206 uses a wrapping cryptographic operation to generate a wrapped master key $212_{i,j}$ by wrapping, i.e., encapsulating, the master key $208_{i,j}$ with the wrapper key $210_{1,j}$. The wrapped master key $212_{i,j}$ is stored in the non-volatile memory 202.

The key manager 206 uses the master key $208_{i,j}$ and a cryptographic function 214 to generate target wrapper keys $216_{i+1,k}$ and target master keys $218_{i+1,k}$ for devices $100_{i+1,k}$ at the below layer i+1 to which the device $100_{i,j}$ at layer i is connected. To generate the target wrapper keys $216_{i+1,k}$, the cryptographic function 214 may be applied to a combination of the master key $208_{i,j}$ and an attribute of the target device $100_{i-1,k}$ for which the key is generated that is specific to the target device $100_{i+1,k}$, such as a unique identifier (e.g., serial number, worldwide name, etc.) of the target device $100_{i+1,k}$. To generate the target master keys $218_{i+1,k}$, the cryptographic function 214 may be applied to a combination of the master key $208_{i,j}$ and an attribute of the target device $100_{i+1,k}$ for which the key is generated that is not-specific to the target device $100_{i+1,k}$, such as a logical address of the target device $100_{i+1,k}$, an address of a port that connects to the device $100_{i+1,k}$, etc.

In one embodiment, the first or root device $100_{0,0}$ may receive the wrapper key $216_{0,0}$ from the key server 102 and generate the master key $208_{0,0}$ internally as a randomized value. Alternatively, the first device $100_{0,0}$ may also receive the master key $208_{0,0}$ from the key server 102.

Each device $100_{i,j}$ includes device specific code 220 that when executed performs the operations that are specific to the device type. The devices 100 at the lowest layer n may comprise self-encryption devices.

In further implementations, the leaf devices, such as storage devices or self-encryption devices, may be at layers other than the lowest layer if the topology of the hierarchy is not balanced, such that the storage devices may be at different layers of the hierarchy, not just the lowest layer.

Although described embodiments describe keys as flowing downward to lower layers from above layers, in alternative embodiments, keys may flow in other directions in the hierarchy such as laterally or upward.

The volatile memory 204 may comprise one or more refreshable volatile memories, such as a Random Access Memory (RAM), Dynamic RAM (DRAM), or other similar memory device which loses data when power is not continuously applied to the memory 204, such as during a reboot or a cessation of power being supplied to the memory 204. The non-volatile memory 202 may comprise a memory device providing one or more units of persistent storage even during a reboot or a power down state, such as a non-volatile RAM, a solid state disk (SSD), flash disk, magnetic disk drive and other similar non-volatile memory devices.

The cryptographic function 214 may comprise a cryptographic hash function such as MD5 (Message-Digest Algorithm 5) or SHA-1 (Secure Hash Algorithm 1), and other cryptographic hash functions known in the art. The key wrap algorithm to wrap the master key with the wrapper key may comprise a class of symmetric encryption or algorithms designed to encapsulate and protect the master key in an unprotected storage.

The components in the non-volatile memory 202 may persist even during system reboot and initialization, whereas the components in the volatile memory 204 may be erased and lost during a reboot or re-initialization. The wrapped master key $212_{i,j}$ is protected while it remains in the non-volatile memory 202 as a result of the key wrap algorithm performing the encapsulation.

Figure 3:
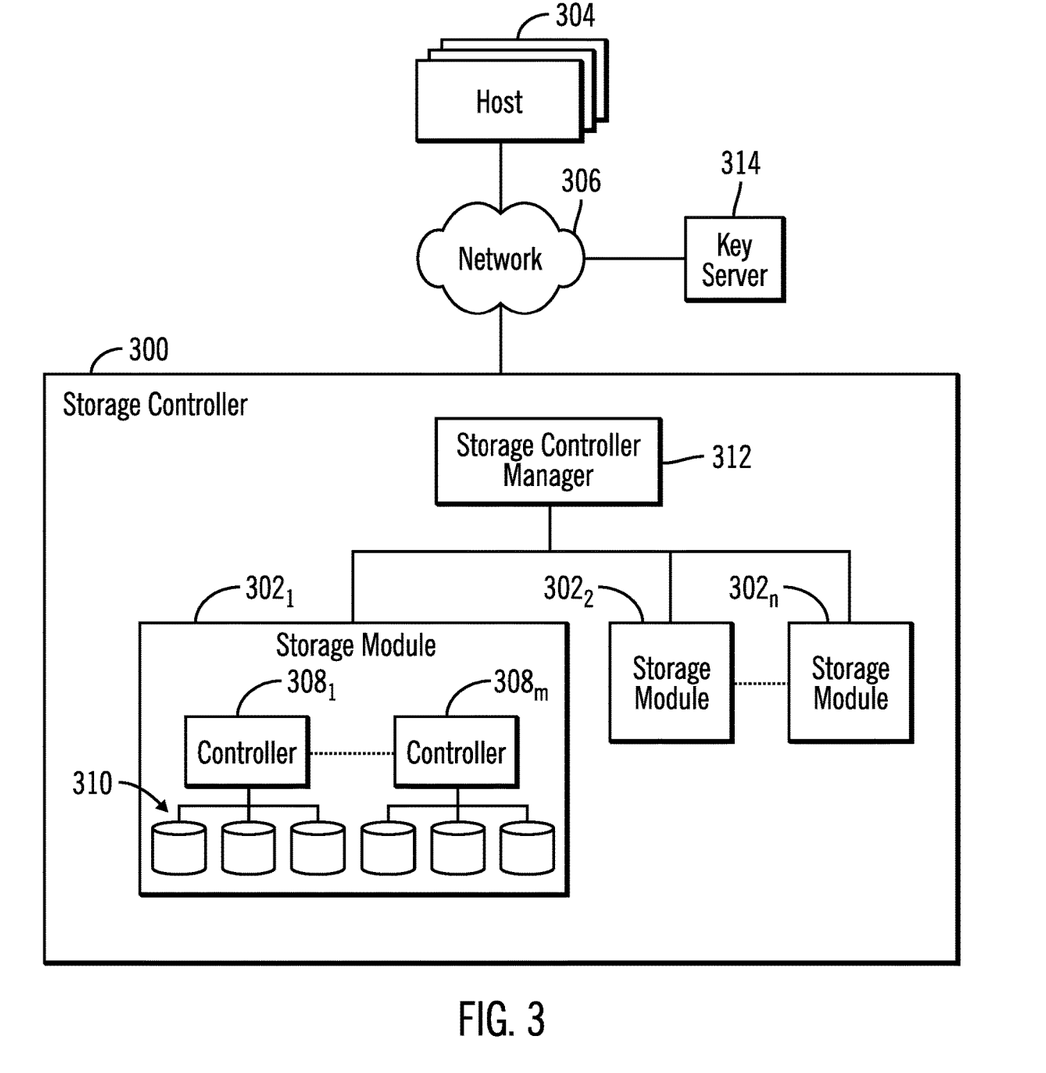
FIG. 3 illustrates an embodiment of a clustered storage controller.

FIG. 3 illustrates a storage controller implementation 300 of the hierarchical devices $100_{i,j}$ of FIG. 1. The storage controller 300 may comprise a clustered storage controller having a plurality of independent storage modules $302_1$, $302_2$ . . . $302_n$ each capable of receiving read and write requests from host systems 304 over a network 306 that are directed to storage devices within the modules storage modules $302_1$, $302_2$ . . . $302_n$. The storage modules $302_1$, $302_2$ . . . $302_n$ may each include components as shown in storage module $302_1$, including one or more controller $308_1$ . . . $308_m$, where each controller manages access to connected storage devices 310. The controllers $308_1$ . . . $308_m$ may comprise a controller type comprising Redundant Array of Independent Disk (RAID), Just a Bunch of Disk (JBOD), Serial Attached SCSI (SAS), Serial AT Attachment (SATA), etc.

A storage controller manager 312 manages the different storage modules $308_1$ . . . $308_m$ as a clustered group, such as a trusted computing group. The storage controller manager 312 may communicate with a key server 314 over the network 306 to access an initial wrapper key and self-generate a master key as a randomized value. In this way, the storage controller 300 comprises an implementation of the hierarchical devices of FIG. 1, wherein the storage controller manager 312 comprises the initial device $100_{0,0}$, the storage modules $302_1$, $302_2$ . . . $302_n$ comprise the devices $100_{1,i}$ at the first layer that are connected to the manager 312, the controllers $308_1$ . . . $308_m$ comprise the devices $100_{2,i}$ at the second layer that are each connected to the storage module $308_i$ in which they are included, and the storage devices 310 comprise the devices at the lowest layer, i.e., leaf nodes, that are connected to the controllers $308_i$ that manage them. Each of the storage devices 310 may comprise self-encryption devices that use the unique encryption key provided to them through the described hierarchical key distribution system to encrypt and decrypt data in the storage device 310 media. Each of the components in the storage controller 300 that functions as a device at one of the layers would include the computational components shown in FIG. 2 to perform key management operations.

The networks 104 and 306 over which devices communicate may comprise a network such as a local area network (LAN), storage area network (SAN), wide area network (WAN), cloud computing model, etc. In further embodiments, some or all of the devices in FIGS. 1 and 3 may be connected by a direct cable connection or may comprise components on a single computer system platform, and may communicate over a bus or via memory.

The storages 310 in FIG. 3 may comprise storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The programs such as the key manager 206, device specific code 220, cryptographic function 214, and any code executed in the components in FIG. 3, including the storage controller manager 312, storage module 302, controller 308, and storages 310 may comprise a software program in a memory executed by a processor of the server 2. In an alternative embodiment, some portion or all of the executable components may be implemented in a hardware component, such as a dedicated integrated circuit, e.g., Application Specific Integrated Circuit (ASIC), expansion card, etc.

Figure 4:
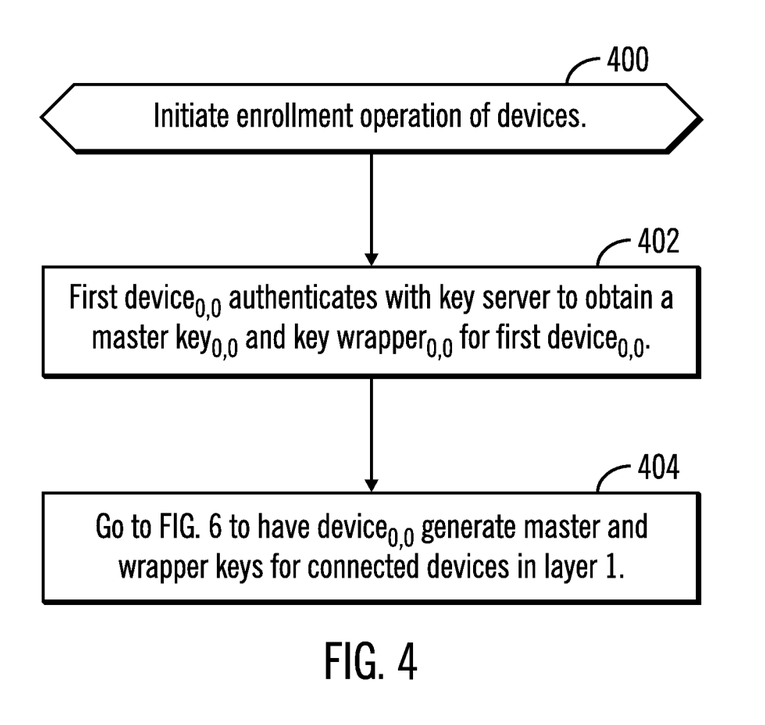
FIGS. 4, 5, and 6 illustrate an embodiment of operations performed at the devices to enroll the devices in a key management scheme and provide wrapped master keys at the devices in the hierarchy.

FIG. 4 illustrates an embodiment of operations performed by the key manager 206 in the first device $100_{0,0}$ in the hierarchy to initiate enrollment operations to enroll all the devices $100_{i,j}$ at all layers 0 . . . n in the key generation scheme of the described embodiments. Upon initiating (at block 400) the enrollment process, the key manager 206 of the initial device $100_{0,0}$ authenticates (at block 402) with the key server 102 to obtain a wrapper key $210_{0,0}$ for the initial device $100_{0,0}$. The initial device $100_{0,0}$ may generate the master key $208_{0,0}$ as a random value. Alternatively, the initial device $100_{0,0}$ may also obtain the master key $208_{0,0}$ from the key server 102. The key manager 206 then performs (at block 404) the operations of FIG. 6 to generate master keys $208_{1,i}$ and wrapper keys $210_{1,i}$ for the devices $100_{1,i}$ at the layer 1 below the first layer 0 of the hierarchy. This process initiates a series of operations where in each layer other than the last layer n, the devices generate a master key and key wrapper for the devices in the layer below.

Figure 5:
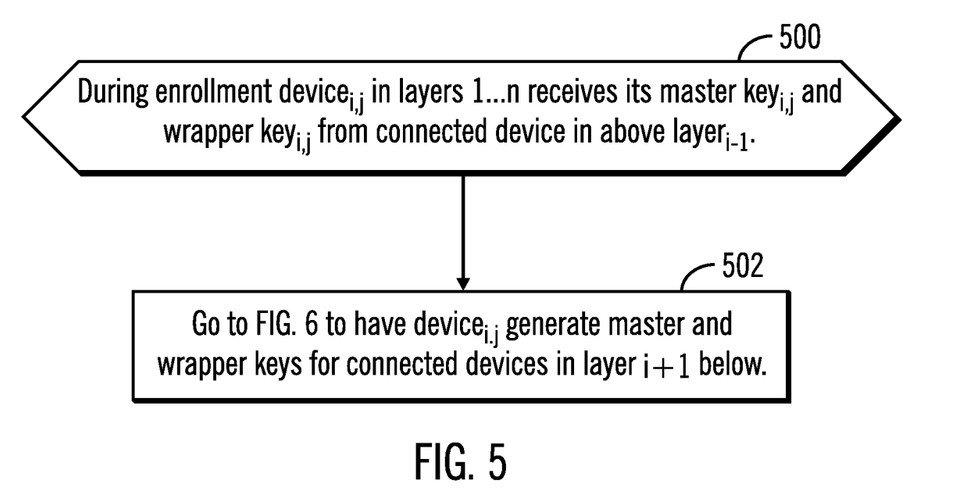

FIG. 5 illustrates an embodiment of operations performed by the key manager 206 of one of the devices $100_{i,j}$ in layers 1 . . . n, below layer 0, receiving a master key $208_{i,j}$ and wrapper key $210_{i,j}$ from a connected device $100_{i-1,k}$ in an above layer i−1 to enroll the device $100_{i,j}$ in the key management scheme. Upon device $100i,j$ in one of the layers 1 . . . n receiving (at block 500) its master key $208_{i,j}$ and wrapper key $210_{i,j}$ during enrollment, the key manager 206 performs (at block 502) the operations of FIG. 6 to have the key manager 206 in device $100_{i,j}$ generate a master key $208_{i+1,j}$ and wrapper key $210_{i+1,j}$ for each of one or more devices $100_{i+1,j}$ in the below layer i+1 to which device $100_{i,j}$ connects.

Figure 6:
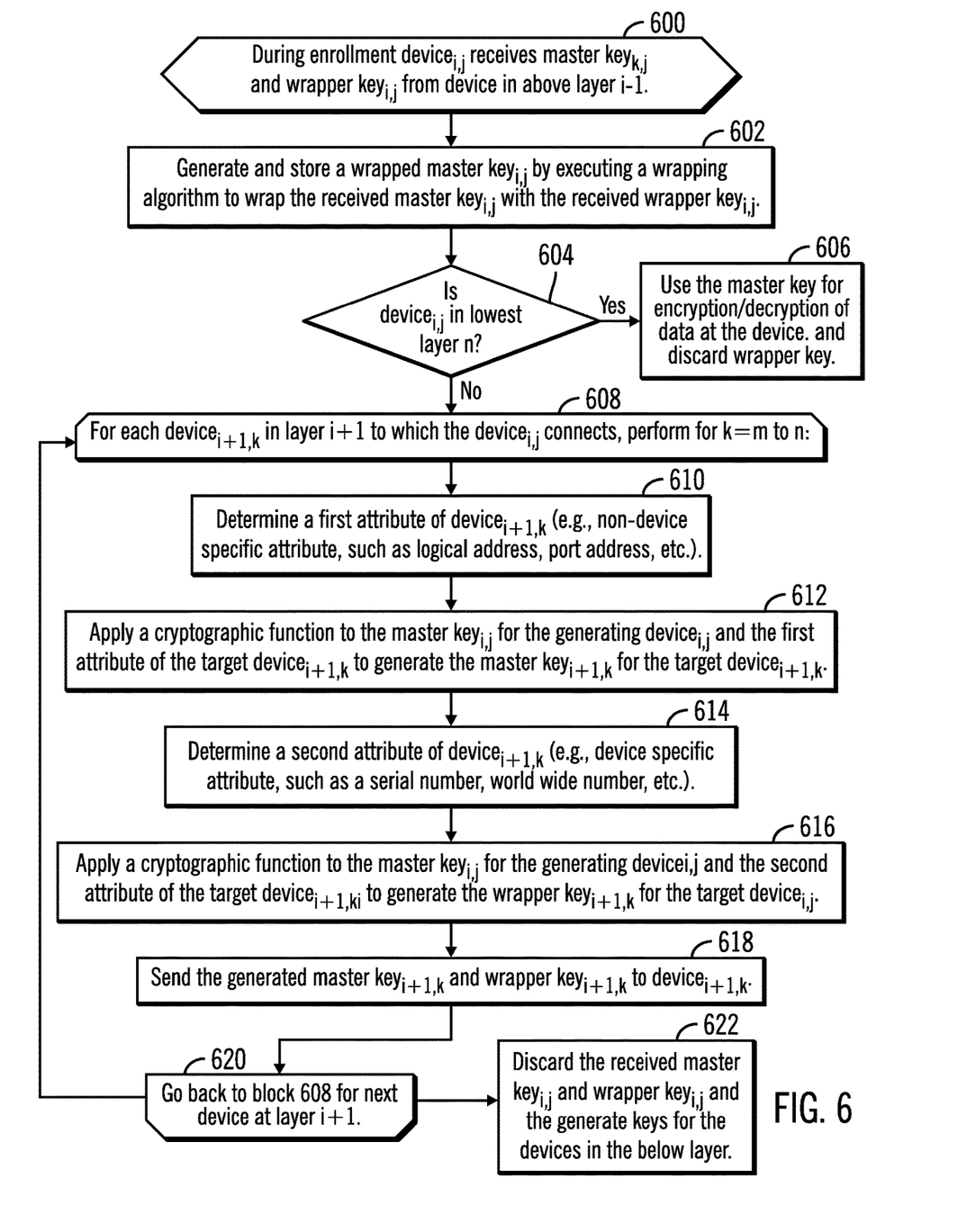

FIG. 6 illustrates an embodiment of operations performed by the key manager 206 in a device $100_{i,j}$ during enrollment upon receiving its master key $208_{i,j}$ and wrapper key $210_{i,j}$ from one of the devices $100_{i-1,k}$ in the above layer i−1. Upon receiving (at block 600) the master key $208_{i,j}$ and wrapper key $210_{i,j}$, the key manager 206 generates a wrapped master key $212_{i,j}$ by executing a wrapping algorithm to wrap (or encapsulate) the received master key $208_{i,j}$ with the wrapper key $210_{i,j}$. The wrapped master key $212_{i,j}$ is then stored in the non-volatile memory 202 of the device $100_{i,j}$. If (at block 604) the device $100_{i,j}$ is in the lowest layer n, then the device $100_{i,j}$ uses the master key $208_{i,j}$ for encryption/decryption of data at the device $100_{i,j}$ and does not generate master and wrapper keys as there are no devices below the last layer. The wrapper key $210_{i,j}$ is discarded.

Devices at other levels of the hierarchy, not just the lowest level, may also comprise a self-encrypting device (SED) and control devices in below layers and use their master key to encrypt and decrypt of data at the device.

If (at block 604) the device wrapper key $100_{i,j}$ is not at the lowest layer, i.e., is in layers 0–n−1, then the key manager 206 performs a loop of operations at block 608 through 620 for each device $100_{i+1,k}$ in layer i+1 to which the device $100_{i,j}$ connects for k=m to n. The key manager 206 determines (at block 610) a first attribute of device $100_{i+1,k}$, such as by querying the device $100_{i+1,k}$, or having information on the device $100_{i+1,k}$. In one embodiment, the first attribute may comprise a non-device specific attribute, such as a logical address, network address, port address, etc., that is not tied to the specific device $100_{i+1,k}$. The key manager 206 applies (at block 612) the cryptographic function 214 to the master key $208_{i,j}$ for the generating device $100_{i,j}$ and the first attribute of the target device $100_{i+1,k}$ to generate the master key $208_{i+1,k}$ for the target device $100_{i+1,k}$.

The key manager 206 further determines (at block 614) a second attribute of the device $100_{i+1,k}$. In one embodiment, the second attribute may comprise a device specific attribute, such as a unique serial number of the device $100_{i+1,k}$, a worldwide number, etc., that remains tied to the device $100_{i+1,k}$. The key manager 206 applies (at block 616) the cryptographic function 214 to the master key $208_{i,j}$ for the generating device $100_{i,j}$ and the second attribute of the target device $100_{i-1,k}$ to generate the wrapper key $210_{i+1,k}$ for the target device $100_{i-1,k}$. The key manager 206 sends (at block 618) the generated master key $208_{i+1,k}$ and wrapper key $210_{i+1,k}$ to the target device $100_{i+1,k}$, which then triggers the operations of FIG. 6 at the target device $100_{i+1,k}$. After generating and transmitting all the master $208_{i+1,k}$ and wrapper $210_{i+1,k}$ keys to the target devices $100_{i+1,k}$, the key manager 206 may discard and erase all the received and generated master and wrapper keys from the volatile memory 204, leaving the wrapped master key $212_{i+1,k}$ in the non-volatile or persistent storage.

With the described operations of FIGS. 4, 5, and 6, the key managers in the devices $100_{i,j}$ generate master and wrapper keys for the connected devices in the below layer, which in turn generate the master and wrapper keys to the below layer to propagate unique master wrapper and keys through the devices from an initial master key received at the device $100_{0,0}$ at the top of the hierarchy of devices. The result of the enrollment is that each device has its wrapped master key stored in persistent storage.

In the described embodiments of FIG. 6, each generating device $100i,j$ generates both the master key $208_{i-1,k}$ and wrapper key $210_{i+1,k}$ to the target device $100_{i+1,k}$ at the next hierarchical level. In an alternative embodiment, a device $100_{i,j}$ may only generate and provide the wrapper key $210_{i+1,j}$ to the device $100_{i+1,j}$ in the next layer, but not the master key. Instead, in such alternative embodiments, each device $100_{i,j}$ may self-generate its own master key $208_{i,j}$ and then wrap its self-generated master key $208_{i,j}$ with the received wrapper key $210_{i,j}$ generated by the device in the above layer. In such alternative embodiments, a device $100_{i,j}$ may generate its master key $208_{i,j}$ as a randomized value and perform the operations at blocks 614 and 616 in FIG. 6 to generate the wrapper key $210_{i,j}$ for the one or more devices at the next layer.

Figure 7:
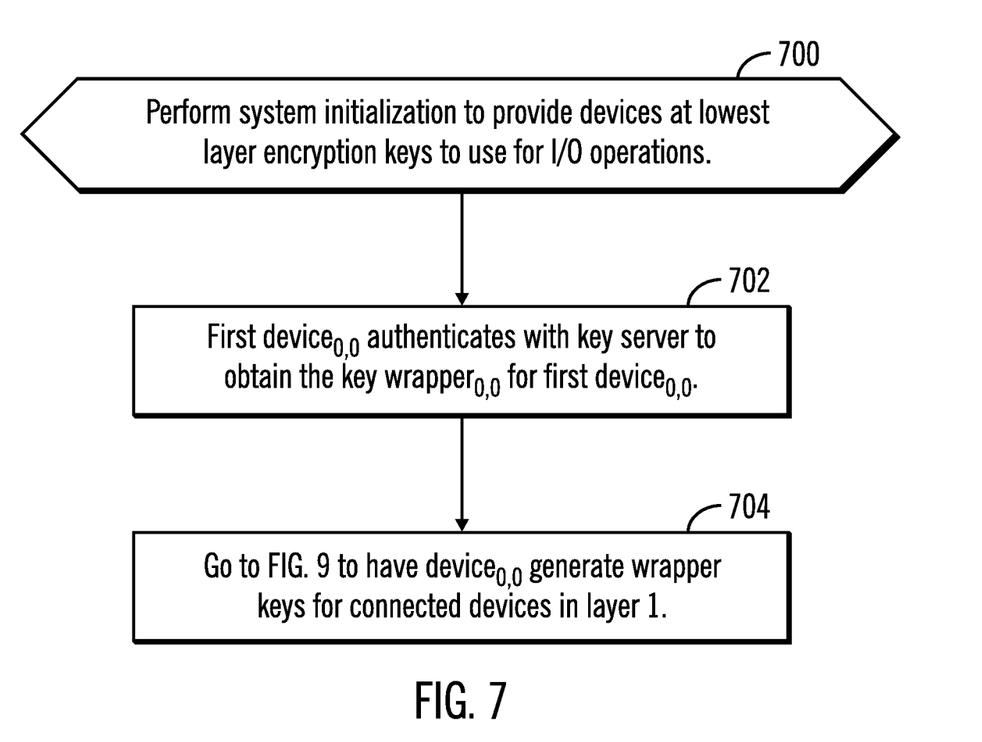
FIGS. 7, 8, and 9 illustrate an embodiment of operations provide wrapper keys to devices in the hierarchy to decrypt wrapped master keys.

FIG. 7 illustrates an embodiment of operations performed by the key manager 206 in the first device $100_{0,0}$ in the hierarchy to initialize the master key and generate the wrapper key at all layers 0 . . . n in the key generation scheme of the described embodiments. Upon initiating (at block 700) the initialization routine, the key manager 206 of the initial device $100_{0,0}$ authenticates (at block 702) with the key server 102 to obtain the wrapper key $210_{0,0}$ for the initial device $100_{0,0}$. The key manager 206 then performs (at block 704) the operations of FIG. 9 to generate wrapper keys $210_{1,j}$ for the devices $100_{1,j}$ at the layer 1 below the first layer 0 of the hierarchy. This process initiates a series of operations where in each layer other than the last layer n, the devices in each layer generate the key wrapper for the devices in the layer below so they may unwrap their wrapped master key $212_{i,j}$.

Figure 8:
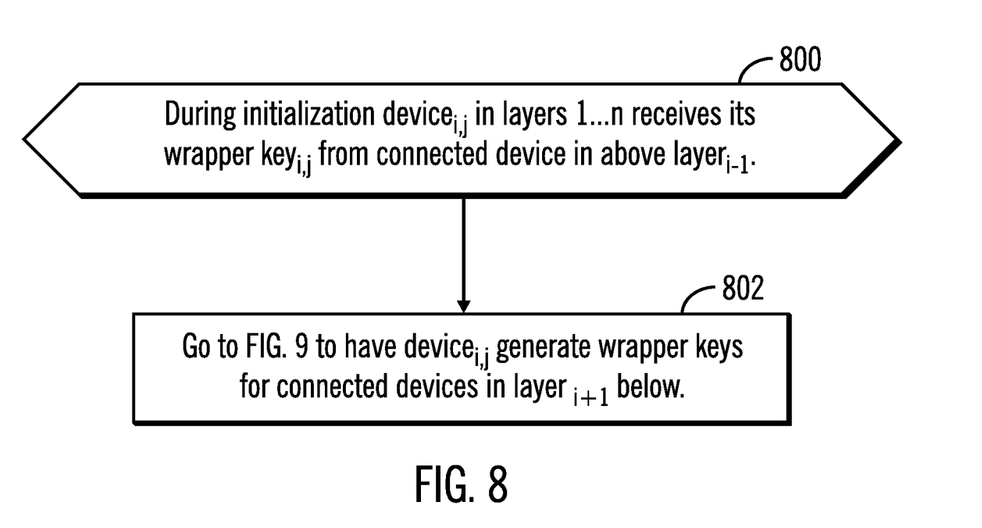

FIG. 8 illustrates an embodiment of operations performed by the key manager 206 of one of the devices $100_{i,j}$ in layers 1 . . . n, below layer 0, when receiving during the initialization the wrapper key $210_{i,j}$ from a connected device $100_{i-1,k}$ in an above layer i−1 to initialize the device $100_{i,j}$ in the key management scheme. Upon device $100_{i,j}$ in one of the layers 1 . . . n receiving (at block 800) its wrapper key $210_{i,j}$ during initialization, the key manager 206 performs (at block 802) the operations of FIG. 9 to have the key manager 206 in device $100_{i,j}$ generate the wrapper key $210_{i+1,j}$ for each of one or more devices $100_{i+1,j}$ in the below layer i+1 to which device $100_{i,j}$ connects.

Figure 9:
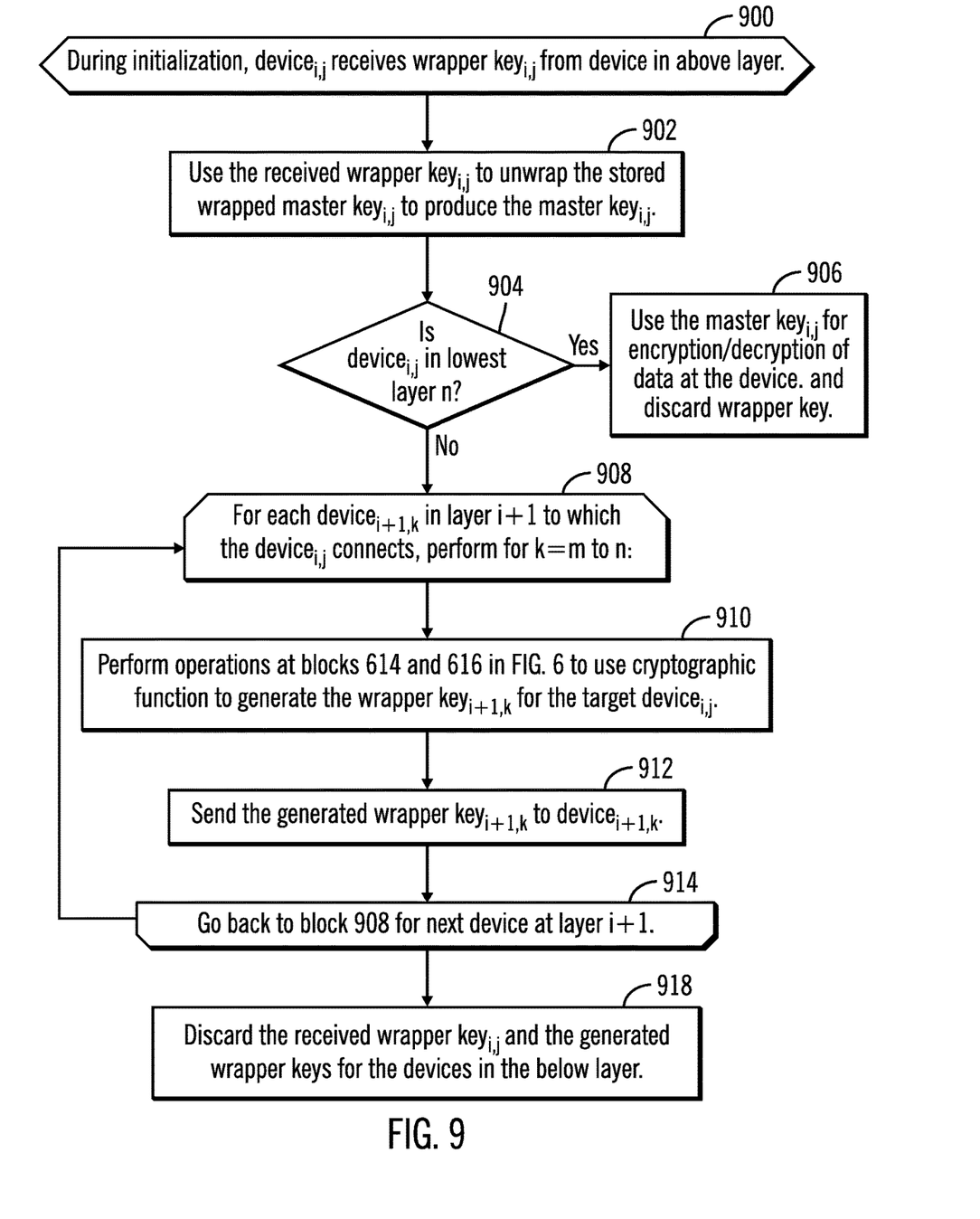

FIG. 9 illustrates an embodiment of operations performed by the key manager 206 in a device $100_{i,j}$ during initialization upon receiving its wrapper key $210_{i,j}$ from one of the devices $100_{i-1,k}$ in the above layer Upon receiving (at block 900) the wrapper key $210_{i,j}$, the key manager 206 uses (at block 902) the received wrapper key $210_{i,j}$ to unwrap or decrypt the wrapped master key $212_{i,j}$ by executing a wrapping algorithm to produce the master key $208_{i,j}$. If (at block 904) the device $100_{i,j}$ is in the lowest layer n, then the device $100_{i,j}$ uses the master key $208_{i,j}$ for encryption/decryption of data at the device $100_{i,j}$. The wrapper key $210_{i,k}$ is discarded and erased.

If (at block 604) the device wrapper key $100_{i,j}$ is not at the lowest layer, i.e., is in layers 0–n−1, then the key manager 206 performs a loop of operations at block 908 through 914 for each device $100_{i+1,k}$ in layer i+1 to which the device $100_{i,j}$ connects for k=m to n. The key manager 206 performs (at block 910) the operations at blocks 614 and 616 in FIG. 6 to use the cryptographic function 214 to generate the wrapper key $210_{i+1,k}$ for the target device $100_{i+1,k}$. The key manager 206 sends (at block 912) the generated wrapper key $210_{i+1,k}$ to the target device $100_{i+1,k}$, which then triggers the operations of FIG. 9 at the target device $100_{i+1,k}$. After generating and transmitting all the wrapper $210_{i+1,k}$ keys to the target devices $100_{i+1,k}$, the key manager 206 may discard all the received and generated wrapper keys from the volatile memory 204, leaving the wrapped master key $212_{i+1,k}$ in the non-volatile or persistent storage.

If one of the devices $100_{i,j}$ in the hierarchy is replaced with a replacement device $100'_{i,j}$, then the enrollment operation of FIG. 6 would be performed by having the device $100_{i-1,k}$ in the layer i−1 above the replaced device $100_{i,j}$ generate the master key $208_{i,j}$ and wrapper key $210_{i,j}$ for the replacement device $100'_{i,j}$. In this way, the same master key $208_{i,j}$ provided to the replaced device $100_{i,j}$ is provided to the replacement device $100'_{i,j}$ because the logical address is used to calculate the master key $208_{i,j}$, which remains the same for the replacement device $100'_{i,j}$. However, the wrapper key $210_{i,j}$ provided to the replacement device $100'_{i,j}$ is different from the wrapper key for the replaced device $100_{i,j}$, because the wrapper keys are calculated from the device specific information of the replacement device $100'_{i,j}$ which is different from that of the replaced device $100_{i,j}$. Further, because the replacement device $100'_{i,j}$ has the same master key $208_{i,j}$ as the replaced device $100_{i,j}$, the replacement device $100'_{i,j}$ would generate the same wrapper key and master keys for any connected devices $100_{i+1,j}$ below the replacement device $100'_{i,j}$ in the hierarchy during subsequent initializations or enrollments of replaced devices. In this way, the described embodiments allow serviceability because replacement of one device in the hierarchy will not affect how the wrapper keys are generated during subsequent initializations, so that all devices below the replaced device can continue to receive the same wrapper keys as previously received to unwrap their wrapped master keys.

Described embodiments provide a secure technique to generate keys for devices in a hierarchy of devices, such that devices at the lowest level of the hierarchy have a master encryption key to use to decrypt and encrypt data at the device by having each of the devices in the hierarchy involved in generating master and wrapper keys based on initial master and wrapper keys provided to a top level device in the hierarchy from a key server.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as g, i, j, k, m, n, t, used to designate a number of instances of an element may indicate a variable number of instances of that element when used with the same or different elements.

Figure 10:
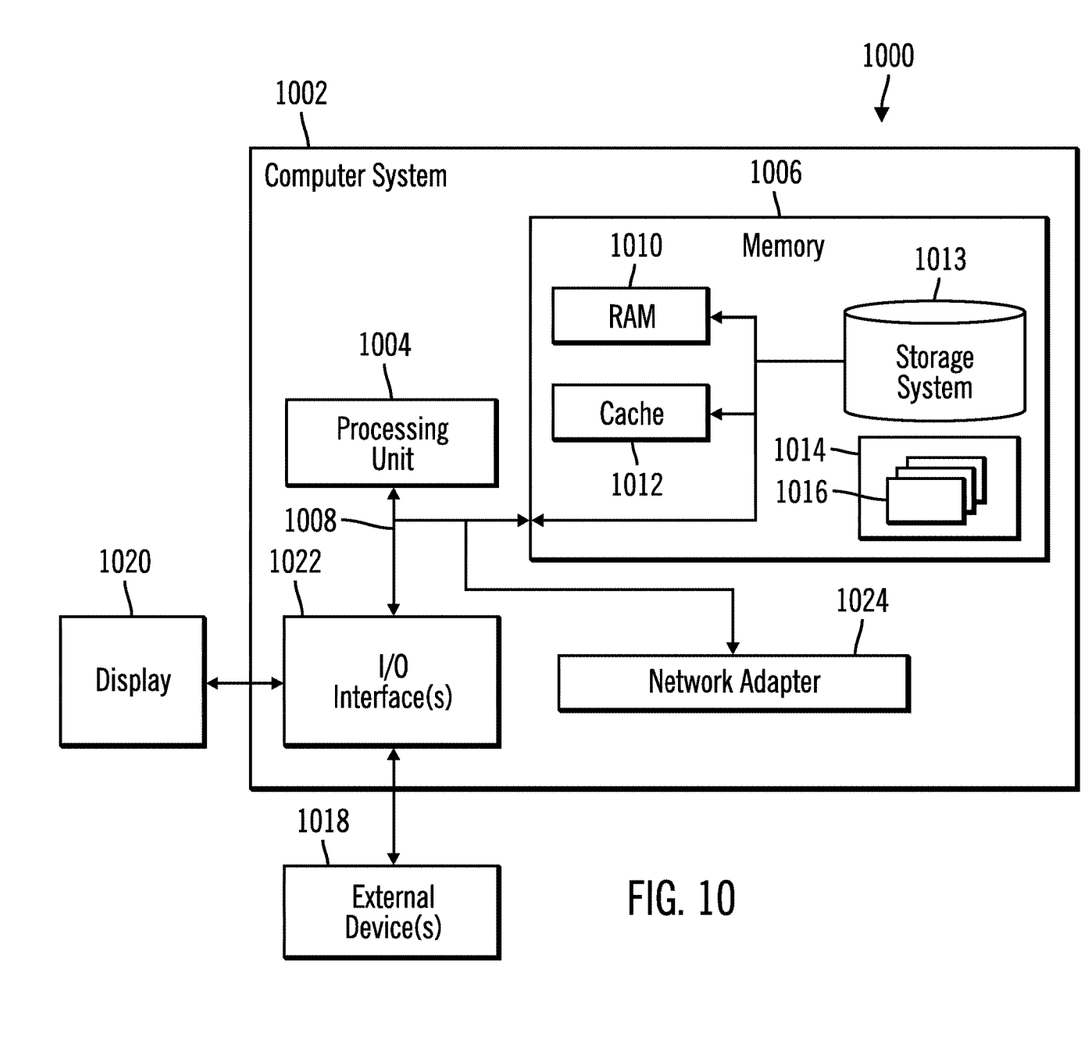
FIG. 10 illustrates a computing environment in which the components of FIGS. 1, 2, and 3 may be implemented.

The computational components of FIGS. 1, 2, and 3 including the devices 100$_{i,j}$ and the storage controller components 312, 302$_1$, 302$_2$ . . . 302$_n$, and 308$_1$ . . . 308$_m$, may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components may be used in conjunction with computer system/server 1002. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing encryption keys for a plurality of devices, the computer program product comprising a computer readable storage medium having computer readable program code embodied therein that executes in a plurality of devices to perform operations, the operations comprising:
   storing, by each device of the plurality of devices in multiple levels of a hierarchy of devices, a wrapped master key comprising a master key for the device and a wrapper key generated by another of the devices;
   using, by each device of the plurality of the devices in the multiple levels of the hierarchy of devices, the master key for the device to generate a lower level wrapper key and master key for a lower level device at a lower level in the hierarchy of devices;
   using, by each device of the plurality of the devices at a lowest level of the hierarchy of devices, a wrapper key for the device to decrypt a stored wrapped master key to produce the master key for the device; and
   encrypting and decrypting data by each device of the plurality of the devices at the lowest level of the hierarchy of devices.

2. The computer program product of claim 1, wherein the operations further comprise: interfacing, by a root device in the hierarchy of devices, with a key server to obtain a root key and a root wrapper key; and generating, by the root device, master keys and wrapper keys for devices in a first level of devices in the hierarchy of devices.

3. The computer program product of claim 1, wherein the operations further comprise: self-generating, by each device of the plurality of devices at the multiple levels of the hierarchy of devices, the master key for the device.

4. The computer program product of claim 1, wherein the using, by each device, the master key to generate the lower level wrapper key for the lower level device comprises: applying a cryptographic function to the master key for the device and an attribute of the lower level device to generate the lower level wrapper key for the lower level device.

5. The computer program product of claim 4, wherein the attribute comprises a device specific value unique to the lower level device for which the wrapper key is generated.

6. The computer program product of claim 1, wherein the operations further comprise:
transmitting the wrapper key to the lower level device;
using, at the lower level device, the master key for the lower level device and the transmitted wrapper key to generate the wrapped stored master key stored at the lower level device; and
discarding, at the lower level device, the master key and the transmitted wrapper key used to generate the wrapped stored master key.

7. The computer program product of claim 1, wherein the operations further comprise:
performing an initialization at a device of the plurality of devices by performing:
receiving the wrapper key for the device and using the wrapper key to decrypt the wrapped master key stored at the device to produce a decrypted master key; and
using the decrypted master key to generate the lower level wrapper key of the lower level device and transmitting the generated lower level wrapper key to the lower level device to use to decrypt a wrapped lower level master key stored at the lower level device.

8. The computer program product of claim 1, wherein each device of the plurality of devices in the hierarchy of devices uses the master key for the device to generate the wrapper key for at least one device connected in a below level in the hierarchy of devices, wherein each of the plurality of devices has a unique master key and wrapper key.

9. A system for managing encryption keys for a plurality of devices, comprising:
a plurality of interconnected devices in multiple levels of a hierarchy of devices, wherein each of the devices includes a processor and a computer readable storage medium having program code executed by the processor;
wherein the devices execute the program code to perform operations comprising:
storing, by each device of the plurality of devices in the multiple levels of the hierarchy of devices, a wrapped master key comprising a master key for the device and a wrapper key generated by another of the devices;
using, by each device of the plurality of the devices in the multiple levels of the hierarchy of devices, the master key for the device to generate a lower level wrapper key and master key for a lower level device at a lower level in the hierarchy of devices;
using, by each device of the plurality of the devices at a lowest level of the hierarchy of devices, a wrapper key for the device to decrypt a stored wrapped master key to produce the master key for the device; and
encrypting and decrypting data by each device of the plurality of the devices at the lowest level of the hierarchy of devices.

10. The system of claim 9, wherein the operations further comprise: interfacing, by a root device in the hierarchy of devices, with a key server to obtain a root key and a root wrapper key; and generating, by the root device, master keys and wrapper keys for devices in a first level of devices in the hierarchy of devices.

11. The system of claim 9, wherein the operations further comprise: self-generating, by each device of the plurality of the devices at the multiple levels of the hierarchy of devices, the master key for the device.

12. The system of claim 9, wherein the using, by each device, the master key to generate the lower level wrapper key for the lower level device comprises: applying a cryptographic function to the master key for the device and an attribute of the lower level device to generate the lower level wrapper key for the lower level device.

13. The system of claim 12, wherein the attribute comprises a device specific value unique to the lower level device for which the wrapper key is generated.

14. The system of claim 9, wherein the operations further comprise:
transmitting the wrapper key to the lower level device;
using, at the lower level device, the master key for the lower level device and transmitted wrapper key to generate the wrapped stored master key stored at the lower level device; and
discarding, at the lower level device, the master key and the transmitted wrapper key used to generate the wrapped stored master key.

15. A method for managing encryption keys in each device of a plurality of devices, comprising:
storing, by each device of the plurality of devices in multiple levels of a hierarchy of devices, a wrapped master key comprising a master key for the device and a wrapper key generated by another of the devices;
using, by each device of the plurality of the devices in the multiple levels of the hierarchy of devices, the master key for the device to generate a lower level wrapper key and master key for a lower level device at a lower level in the hierarchy of devices;
using, by each device of the plurality of the devices at a lowest level of the hierarchy of devices, a wrapper key for the device to decrypt a stored wrapped master key to produce the master key for the device; and
encrypting and decrypting data by each device of the plurality of the devices at the lowest level of the hierarchy of devices.

16. The method of claim 15, further comprising: interfacing, by a root device in the hierarchy of devices, with a key server to obtain a root key and a root wrapper key; and generating, by the root device, master keys and wrapper keys for devices in a first level of devices in the hierarchy of devices.

17. The method of claim 15, further comprising: self-generating, by each device of the plurality of the devices at the multiple levels of the hierarchy of devices, the master key for the device.

18. The method of claim 15, wherein the using, by the device, the master key to generate the lower level wrapper key for the lower level device comprises:

applying a cryptographic function to the master key for the device and an attribute of the lower level device to generate the lower level wrapper key for the lower level device.

19. The method of claim 18, wherein the attribute comprises a device specific value unique to the lower level device for which the wrapper key is generated.

20. The method of claim 15, further comprising:

transmitting the wrapper key to the lower level device;

using, at the lower level device, the master key for the lower level device and the transmitted wrapper key to generate the wrapped stored master key stored at the lower level device; and discarding, at the lower level device, the master key and the transmitted wrapper key used to generate the wrapped stored master key.

\* \* \* \* \*